US008781123B2

(12) United States Patent  (10) Patent No.: US 8,781,123 B2
Vånttinen et al.  (45) Date of Patent: Jul. 15, 2014

(54) METHOD FOR PROCESSING LOCATION INFORMATION RELATING TO A TERMINAL CONNECTED TO A PACKET NETWORK VIA A CELLULAR NETWORK

(75) Inventors: Veijo Vånttinen, Espoo (FI); Haitao Tang, Helsinki (FI)

(73) Assignee: Nokia Corporation, Espoo (FI)

( * ) Notice: Subject to any disclaimer, the term of this patent is extended or adjusted under 35 U.S.C. 154(b) by 4006 days.

(21) Appl. No.: 09/864,017

(22) Filed: May 23, 2001

(65) Prior Publication Data

US 2001/0055394 A1  Dec. 27, 2001

(30) Foreign Application Priority Data

May 24, 2000 (FI) ........................... 20001252

(51) Int. Cl.
 *H04K 1/00* (2006.01)
(52) U.S. Cl.
 USPC ............. 380/258; 380/37; 380/247; 380/270; 455/410; 455/411; 370/328; 370/338
(58) Field of Classification Search
 USPC ........ 455/435.1, 426.1, 456.2, 561, 410, 411; 370/328, 337, 338; 342/357; 380/270, 380/37, 258, 247
 See application file for complete search history.

(56) References Cited

U.S. PATENT DOCUMENTS

| | | | |
|---|---|---|---|
| 5,497,339 A | 3/1996 | Bernard | 364/705.05 |
| 5,548,816 A * | 8/1996 | DeVaney | 455/456.2 |
| 5,812,955 A * | 9/1998 | Dent et al. | 455/561 |
| 5,889,770 A * | 3/1999 | Jokiaho et al. | 370/337 |
| 6,397,065 B1 * | 5/2002 | Huusko et al. | 455/435.2 |
| 6,415,154 B1 * | 7/2002 | Wang et al. | 455/456.1 |
| 6,549,773 B1 * | 4/2003 | Linden et al. | 455/426.1 |
| 6,671,377 B1 * | 12/2003 | Havinis et al. | 380/258 |
| 6,711,147 B1 * | 3/2004 | Barnes et al. | 370/338 |

FOREIGN PATENT DOCUMENTS

| | | |
|---|---|---|
| JP | 2000-4482 A | 1/2000 |
| WO | WO 98/52379 | 11/1998 |
| WO | WO 99/25093 | 5/1999 |

(Continued)

OTHER PUBLICATIONS

XP 002218816: Security Architechture for the Internet Protocol,RFC 2401; Kent, S. and Atkinson, R., Standards Track; Internet draft; Network Working Group, BDN, Corp., Nov. 1998.

(Continued)

*Primary Examiner* — Thanhnga B Truong
(74) *Attorney, Agent, or Firm* — Harrington & Smith

(57) ABSTRACT

A method (400) for processing location information relating to a certain mobile station in a cellular network is presented. The method involves a first network element, which is connected to the cellular network, and second and third network elements, which are connected to a packet data network. The first network receives (401) a location information request (201) relating to the mobile station from a second network element. A security document relating to the second network element is requested (404) from a third network element; establishment (406) of one security association pointing from the second network element to the first network element and involving information is the security document is initiated; after successful establishment of said security association, the data origin of the location service request is authenticated (408); and after successful authentication, a location procedure relating to the mobile station in the cellular network is initiated (410). Also a network element (900), a packet data device (950) and a mobile station (901) are presented.

34 Claims, 7 Drawing Sheets

(56) References Cited

FOREIGN PATENT DOCUMENTS

| WO | WO 99/27746 | 6/1999 |
| WO | WO 99/55114 | 10/1999 |
| WO | WO 00/02406 | 1/2000 |
| WO | WO 00/25545 | 5/2000 |
| WO | WO 00/35236 | 6/2000 |

OTHER PUBLICATIONS

"Digital Cellular Telecommunications System (Phase 2+); Location Services (LCS); (Functional Description)—Stage 2 (GSM 03.71 version 7.2.1 Release 1998)"; Jan. 2000; pp. 1-105.
Japanese Office action for corresponding JP application No. 2001-155632 dated Oct. 5, 2010, pp. 1-17.
Japanese Office action for corresponding JP application No. 2001-155632 dated May 10, 2011, pp. 1-8.

* cited by examiner

US 8,781,123 B2

METHOD FOR PROCESSING LOCATION INFORMATION RELATING TO A TERMINAL CONNECTED TO A PACKET NETWORK VIA A CELLULAR NETWORK

TECHNICAL FIELD

The invention relates in general to locating a device, which is connected to a packet data network via an access network. The invention relates particularly to transmitting location information from the access network to a location server in the packet data network.

BACKGROUND

In cellular networks, for example in Global System for Mobile communications (GSM), the cellular network keeps track of the location of a mobile station (MS) at least on cell level. It is also possible that the geographical location of a MS is determined. Information about the geographical location of a MS can be useful, for example, for certain services or in emergency situations.

There are various services available in the Internet. Many of these services would gain from receiving information, which indicates the location of the device asking for service. For example, an international business may have a service, which automatically gives information about the stores or service points near the user's current location. Currently it is not possible to locate an IP device connected to the Internet, other than using its IP address. An IP address, on the other hand, is not a reliable way to locate a device, as using Mobile IP it is possible to temporarily or more permanently change the location of a device without changing IP address.

In GSM, there are certain circuit-switched data services using which it is possible to have a data connection between, for example, a laptop having a card phone and a server in the Internet. General Packet Radio Service (GPRS), which is an addition to the GSM, is an example of a wireless packet switched network. GRPS and GSM, among other cellular networks, can be used as access networks to packet data networks. A packet data device can be connected to a mobile station, and via the mobile station and a cellular network, the packet data device can communicate with a packet data network. It is possible to locate the packet data device, for example, by locating the mobile station to which it is connected. It would be convenient to transmit location information about the packet data device to a server in the packet data network from an access network, for example from a cellular network. There are, however, problems relating to the confidentiality of location information and to the need of authenticating the parties who request location information.

FIG. 1 presents a schematic diagram of a GSM network and a GPRS network as an example of an access network through which a packet data device can be connected to a packet data network 130. A mobile station (MS) 101 communicates with a base station (BTS) 112a. There may be, for example, a lap top computer or other packet data device 102, connected to the mobile station 101. It is also possible that the mobile station is capable of transmitting and processing packet data. In the GSM radio access network (RAN) 110, base stations are connected to base station controllers (BSC). In FIG. 1 base stations 112a and 112b are connected to a base station controller (BSC) 113. The base station controller is responsible, for example, for allocation of radio resources and for handling handovers, where a mobile station changes the base station it communicates with. The base stations and base station controllers form the GSM RAN 110.

There are separate core networks for the GSM and the GPRS. A GSM core network 140 comprises in the fixed part of the network Mobile Service Switching centers (MSC), and one MSC 141, to which the BSC 113 is connected, is presented as an example in FIG. 1. The GSM core network 140 is usually connected to a Public Switched Telephone Network (PSTN). The GPRS core network 120 comprises GPRS supporting nodes (GSN). Of these nodes, the one which interfaces a packet data network 130, for example the Internet, is called Gateway GPRS supporting node (GGSN). In FIG. 1, a GGSN 122 is presented. Data packets may run through many GSNs, which act as routers. A mobile station or a packet data device connected to the mobile station, which is the endpoint of the data connection, is reachable through one base station controller and the GSN connected to this base station controller is called Serving GPRS support node (SGSN). In FIG. 1, the mobile station 101 or device 102 is reachable via the BSC 113 and the GSN connected to this BSC is SGSN 121.

There are also network elements, which are common for the GSM and GPRS networks. In FIG. 1 the common part of the GSM and GPRS networks is presented as a separate network cloud 150. The common part of the GSM and GPRS comprises, for example, Home Location Register (HLR) 151 and Visitor Location Register (VLR) 152, which take part in subscriber and mobility management. Furthermore, there is an entity called Mobile Location Center (MLC) 153, which is responsible for determining the location of a mobile station.

An entity, which is external to the GSM network, may query the location of a certain mobile station by sending a location request to a Gateway Mobile Location Center (GMLC). FIG. 2 presents an example of the message sequence related to the locating of the mobile station. In FIG. 2, the network elements relating to the procedure are marked with vertical lines, and the name of the entity is above each line. The messages are marked with arrows. The messages and names of the messages are given as examples; the location procedure may alternatively be carried out in a different manner than presented in FIG. 2. An entity requesting the location of a certain mobile station is usually called a Location Service (LCS) Client. This entity sends a LCS request 201 to the GMLC. The LCS request comprises an identifier, for example IMSI (International Mobile Subscriber Identifier) or MSISDN, specifying the mobile station, whose location is queried. The GMLC authenticates the LCS Client to make sure that it is entitled to receive location information. After successful authentication the GMLC asks with the Routing Data message 202 the HLR, which is related to the mobile station, the current or latest MSC, through which the mobile has been reachable; this MSC is called the Visiting MSC (VMSC). After receiving information about the VMSC from the HLR, the GMLC send a Subscriber Request 203 to this VMSC. The VMSC typically pages 204 the MS in question to receive information about the cell, in which the mobile station currently is. Thereafter the mobile station is notified of the location query with a LCS notification 205. The mobile station may either allow or refuse its location to be told. If the mobile station allows its location to be told, the VMSC asks a Serving Mobile Location Center (SMLC), which handles the location of mobile stations in the network the mobile station currently is in, to locate the mobile station with message 206. Thereafter the geographical location of the mobile station is determined. There are various possible ways to determine the location of a mobile station: the cellular network may calculate the location of a mobile station using only the information it has, the mobile station may provide some information for the location process, or the mobile station may perform the location itself, and inform the network about its current location. When the SMLC determines the location of a mobile station, various network elements, such as BSC, BS and MS itself, may be involved in the location process. The messages relating to determining the location are presented in FIG. 2 with arrow 207. After the location has been determined, the SMLC returns the location information to the VMSC (message 208). The VMSC forwards the location information to the GMLC (message 209), which in turn sends a LCS response 210 to the LCS Client, which initiated the location query.

It is possible to give information about the location of a certain mobile station to a party, which is not a part of the cellular network. The LCS Client in FIG. 2 is an example of such a party. The party requesting location information is usually authenticated, because location information generally needs to be treated in a confidential manner. Generally, there has to be a prenegotiated contract between the cellular network operator and the party requesting location information. When the contract is made, usually some secret authentication information (for example a shared key) is exchanged, and for each request, the party has to present it possesses this secret authentication information, for example by encrypting a part of the location request message with the secret key. The GMLC has its copy of the secret keys relating to the LCS Clients, for example. When an LCS Client, for example, tells it identity, the GMLC can then check using its copy of the a secret key that the LCS Client encrypted the text with the correct key. It is also possible to carry out a separate authentication procedure.

It is also possible to locate a packet data device 101, which is connected to a packet data network via an access network having location tracking capabilities. There may be, for example, a Location Server LS 131, which is connected to a packet data network 130, for example to the Internet. In the Internet, the identifier, which typically distinguishes devices from each other, is the IP address. The Location Server thus may know, for example, an IP address of a certain IP device. To be able to ask from a cellular network the location of the IP device, the Location Server must know to which mobile station the IP device is connected. The IP device may thus inform the Location Server, using for example a certain application and protocol designed for this purpose, about its IP address and about the MSISDN number of the mobile station connected to the IP device. The IP address may be a static IP address, which stays the same even when the location of the mobile device/station changes, or a dynamic IP address allocated, for example, by the GPRS network. If a dynamic IP address is used, there is of course some other identifier such as MSISDN which typically together tell to the Location Server the identity of the IP device.

There may be a vast number of Location Servers in the Internet. In principle, each of the Location Server operators should have a contract with each cellular network operator to ensure that it can locate an IP device which is connected to the Internet via a cellular network. The number of contracts a cellular network operator or a Location Server operator should thus make can be enormous. Furthermore, as a service in the Internet may have a short lifetime, it can be a tedious work to maintain a database, for example, containing IP addresses and authentication information of the Location Servers, which are authorized to receive location information from a cellular network. Furthermore, a packet data device connected to a packet network via an access network, for example a cellular network, may wish to authenticate a Location Server before information about the location of the packet data device is transmitted to the Location Server.

SUMMARY

An object of the invention is to present a flexible and scalable method for processing location information relating to a packet data device, which is connected to a packet data network via an access network capable of determining location, and for providing said location information to a network element, which is connected to the packet data network, after authenticating the network element requesting the location information. A further object of the invention is that the packet data device is able to authenticate the network element requesting the location information.

Objects of the invention are achieved by establishing a security association towards a first network element, which is connected to an access network having location determination capabilities and to which location information requests from a packet data network are sent, from a second network element with the help a third network element, which second and third network elements are connected to the packet data network. Optionally a security association pointing from the second network element to the packet data device is also established.

A method according to the invention is a method for processing location information, which is related to a certain mobile station in a cellular network, the method comprising the steps of:
 a first network element, which is connected to the cellular network, receiving a location information request relating to the mobile station from a second network element, which is connected to a packet data network,
 requesting from a third network element, which is connected to the packet data network, a security document relating to the second network element,
 initiating the establishment of at least one security association, which security association specifies at least data origin authentication and points from the second network element to the first network element and which establishment involves use of information comprised in the security document,
 after successful establishment of said security association, authenticating the data origin of the location service request, and
 if the data origin of the location service request is authenticated successfully, initiating a location procedure relating to the mobile station in the cellular network.

A network element of a cellular network is a network element according to the invention and it comprises
 means for receiving from a packet data network a location information request relating to a certain mobile station,
 means for initiating a location procedure in the cellular network,
 means for establishing security associations pointing to the network element from a network element of the packet data network,
 means for performing security functions as specified by the security associations on data it receives from the packet data network,
 means which are arranged to determine, if there is an existing security association pointing to the network element from a sender of a location information request, and
 means for initiating security association establishment, which are arranged to establish a security association if there does not exist a security association, which points towards the network element from the sender of a location information request.

The invention relates further to a device being an integral part of a mobile station or being attachable to a mobile station, said device comprising
   means for receiving information about a location information request and about a sender of a location information request from the mobile station and
   means for exchanging with a network element connected to a cellular network information about a security association, which points to the network element from the sender of the location information request.

The invention relates also to a mobile station comprising means for receiving a notification from a cellular network about a location information request, means for responding to the cellular network with a notification response, and means for notifying a device, which is either an integral part of the mobile station or attached to the mobile station, about the location information request.

In a method according to the invention, there is a first network element, which is typically a network element of cellular network functioning as an access network to a packet data network. This network element is able to handle location information requests and responses with external network elements. The Gateway Mobile Location Center described above is an example of such a first network element. The actual location of a mobile station can be determined by other network elements of the access networks or the mobile station may itself inform the access network of its location. The first and second network elements are connected to a packet data network, and via this packet data network the second network element may exchange information with the first network element.

Before location information is transmitted to the second network element, the second network is authenticated. This can be done by establishing a security association from the second network element to the first network element. In this description term security association refers to an agreed set of security services that are to be applied to the data transmitted from a first entity to a second entity; the unidirectional security association points towards the second entity. Each security association specifies at least one security service. Data origin authentication (authentication of the sending network element), data integrity and data encryption are examples of such security services. They may also include some details about security key management: if secret key cryptography is used, they may indicate a key distribution center, or if public key cryptography is used, they may indicate a certification center. A bi-directional security association indicates the security services to be applied on data sent to either direction between two network elements. The security services relating to a first direction may be different from those relating to the opposite direction.

Before the security services indicated by a security association can be used, the security association needs to be established. Especially in a packet data network, where there are no dedicated connections, the existence of a security association is important for being able to securely transmit data. In this description the term establishing a security association refers to a procedure, where the first network element and the second network element in a secure manner negotiate the details of a security association pointing to one of them. One way to obtain a security association is a separate contract, for example, between firms and thereafter configuring network elements so that security associations according to the contract are established. A more flexible and automatic way is to use a third network element, who is trusted by both the first network element and the second network element (or actually by the operators owning the first and second network elements), as an arbitrator. The third network element as an arbitrator can provide security documents to the first and second network elements, and using the information contained in these security documents, the first and second network element can check the origin of messages and thereafter negotiate and establish at least one security association pointing towards the first network element. It may be assumed that after a security association is set, the negotiated security services are applied on the data packets relating to that security association.

The use of a third network element as a key management center enables a first network element and a second network element to establish a security association without a previously negotiated contract. In a method according to the invention, a unidirectional security association pointing towards the first network element is sufficient for the first network element, for example, to authenticate the origin of the location request to be the second network element and to check that the location request has not been tampered. There may be a second unidirectional security association pointing towards the second network element, this security association specifying the authentication of origin. This way the second network element may check that a location response is sent by the first network element. Furthermore, to keep location information private, the second security association may indicate that the data is encrypted.

Usually the establishment of a security association is, however, not enough for transmitting location information. The first network element may check that the second network entity is allowed to receive location information or the mobile station may deny its location information to be sent to the second network element. Furthermore, the mobile station or a separate packet data device connected to the mobile station may want to set up a separate security association pointing from the second network element towards itself and thereafter check the origin of the location information request. After successfully authenticating the origin of the location information request, the location data may be transmitted to the second network element via the first network element, to which it is deliver by the cellular network using cellular network protocols. The location data may, alternatively or in addition, be transmitted from the packet data device directly to the second network element using packet data protocols, or—if the packet data device is an integral part of the mobile station—from the mobile station directly to the second network element using packet data protocols. It is possible that the location procedure of the cellular network is used only to inform the mobile station and the packet data device connected to the mobile station that the location of the packet data device is being requested. Thereafter the packet data device may determine its location without involving the cellular network and transmit the location information directly to the second network element.

BRIEF DESCRIPTION OF THE DRAWINGS

The novel features which are considered as characteristic of the invention are set forth in particular in the appended Claims. The dependent claims describe some preferred embodiments of the invention. The invention itself, however, both as to its construction and its method of operation, together with additional objects and advantages thereof, will

DETAILED DESCRIPTION

Figure 1:
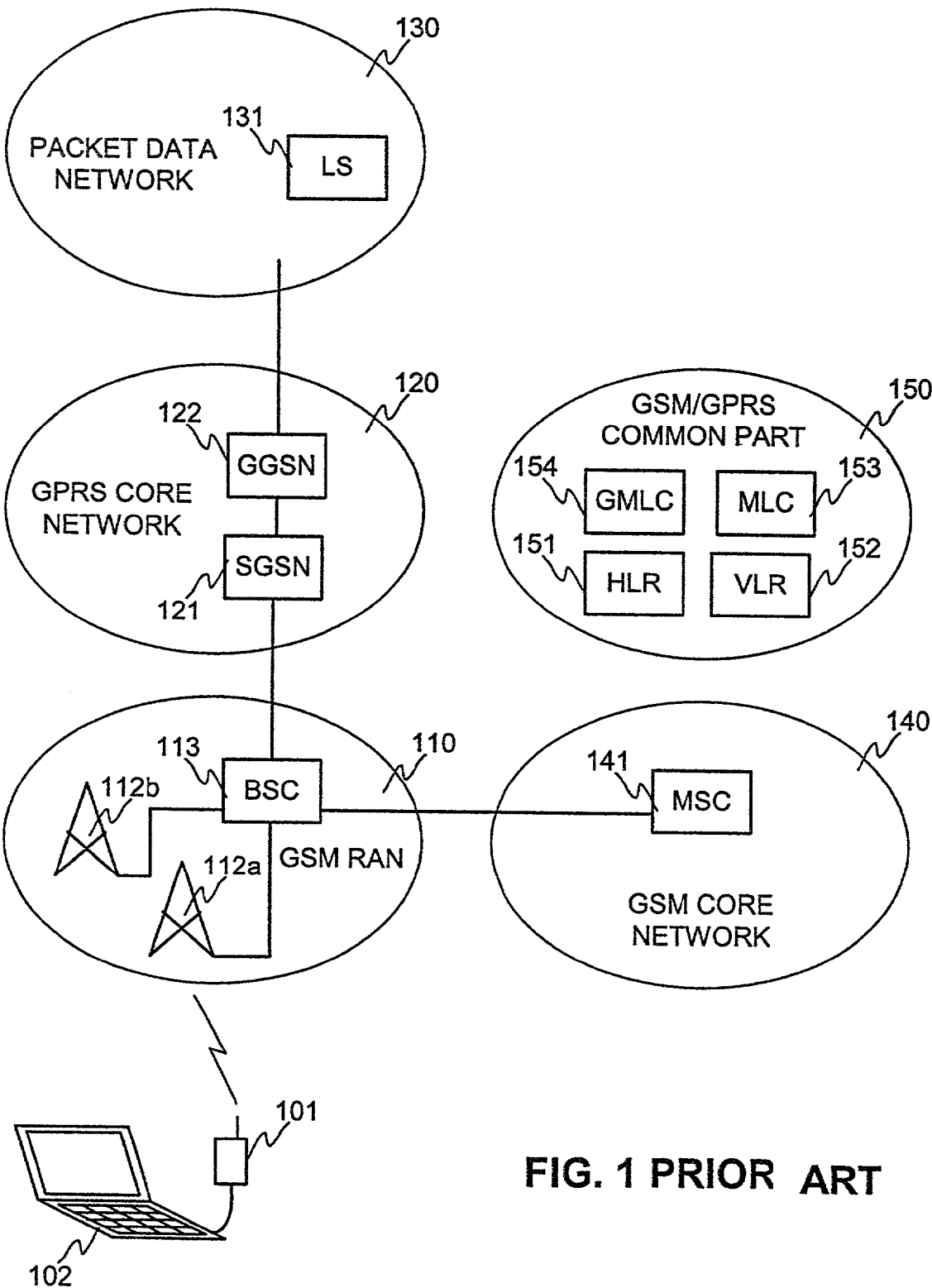
FIG. 1 illustrates schematically an access network capable of locating a terminal and a packet data network according to prior art.
Figure 2:
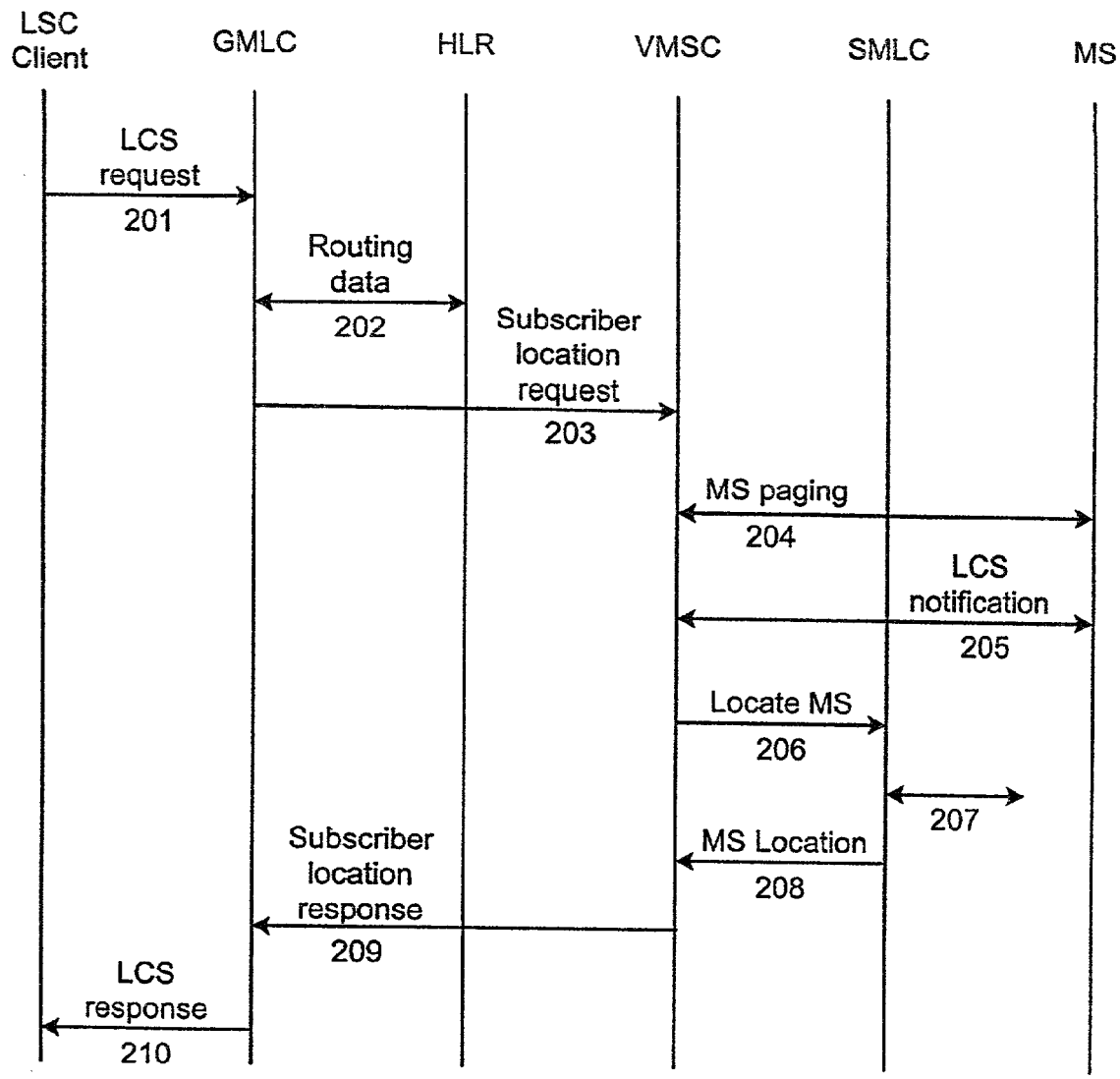
FIG. 2 illustrates a message sequence chart describing a location information transfer according to prior art.

FIGS. 1-2 are discussed in detail in the description relating to prior art.

In the following, the GSM and GPRS networks are used as an example of an access network, which is capable of locating a terminal communicating with the access network and though which it is possible to have a connection to a packet data network. Universal Mobile Telecommunication System is a further example of such an access network. Furthermore, an IP network is used as an example of a packet data network and an IP device is used as an example of a packet data device. The GMLC is used as an example of the first network element, a Location Server is used as an example of the second network element and a key management center is used as an example of the third network element.

The Internet Security Association described in Security Architecture for the Internet Protocol (RFC 2401) is an example of a security association. For the Internet Security Association it is specified that it can require data origin authentication or data encryption. A multiple of Internet Security Associations may have to be established, if both data origin authentication and data encryption are to be applied. A bi-directional security association can be implemented, for example, with two Internet Security Associations pointing to opposite directions. The actual data origin and data integrity service and data encryption service are provided by IPSec or Ipv6 protocol, when Internet Security Associations are used. Data origin and data integrity services are provided with an authentication header (AH) and data encryption with encryption of the security payload (ESP). The use of Internet Security Associations provides security services, which are applied on IP data packets. The Internet Security Associations are established, for example, using the ISAKMP protocol or Oakley key exchange protocol. Therefore it is not necessary for the network elements, which are endpoints of an Internet Security Association, to have additional applications or software in addition to the IPSec or Ipv6 and, for example, ISAKMP.

In a method according to the invention, it is also possible to use other security association than Internet Security Associations. A security association can be established between two higher-layer (above network layer) protocols or applications, too. It is also possible to tunnel a security association via some network elements, or to use transitive security associations. Transitive security association means that while there is a first security association from A to B and a second security association from B to C, there is a transitive security association from A to B.

Figure 3:
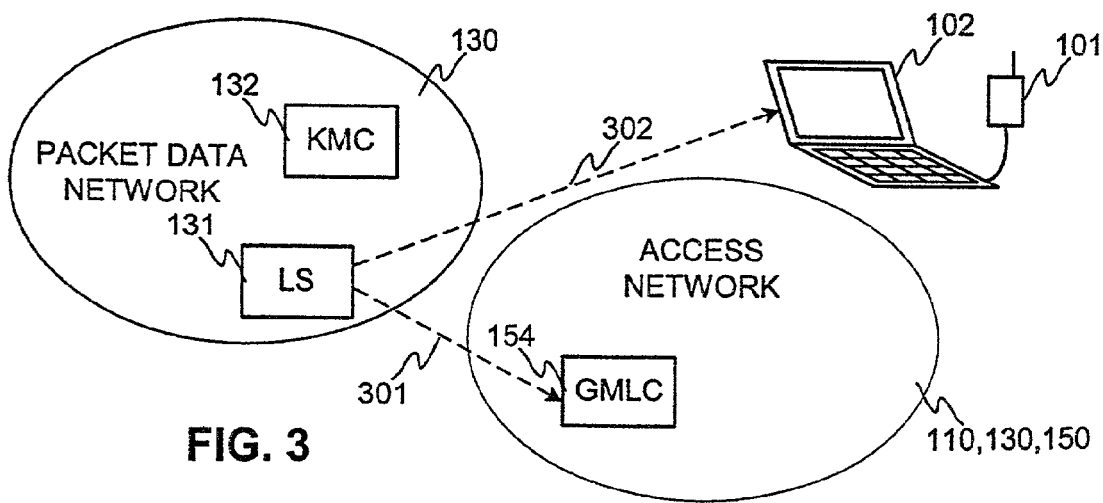
FIG. 3 illustrates schematically a key management center in a packet data network and some security associations between the key management center and a Location Server and a Gateway Mobile Location Center.

FIG. 3 illustrates Key Management Center KMC 132 and a Location Server LS 131 in a packet data network 130. It further presents in the GSM/GPRS network the Gateway Mobile Location Center GMLC 154, which is able to exchange packet data via the packet data network with the Location Server. A mobile station 101 is also illustrated, and an IP device 102 connected to the mobile station. Again, the IP device may be an integral part of the mobile station.

For the Location Server to receive location information, the GMLC has to be able to authenticate the origin of the location information request or, in other words, to be able to verify the identity the external client (Location Server) sending the location information request. One way to do this is to have an established security association, which specifies at least data origin authentication, pointing from the Location Server towards the GMLC. This security association is presented with the dashed arrow 301 in FIG. 3.

The Key Management Center is involved in establishing the security association by producing a security document, which allows the GMLS to authenticate LS before or during the establishment of the security association 301. The KMC should thus be able to authenticate at least LS (either off-line beforehand or on-line during the location information request procedure) and be trusted at least by the GMLC, preferably by both the GMLC and the LS. In other words, the GMLC should accept, for example, public key certificates signed by the KMC or, if shared secrets are used, both the GMLC and the LS should each have a common shared key with the KMC. In the first case the KMC is usually called a certification agent and in the latter it is a key distribution center. The Kerberos system is one example of a key distribution center. It is also possible that the KMC is actually a tree of key management centers, and GMLC deals with one leaf-KMC and LS deals with other leaf-KMC. Because the leaf-KMCs belong to a same tree, it is possible to create a security document, which allows the GMLC to authenticate the LS securely.

Figure 4:
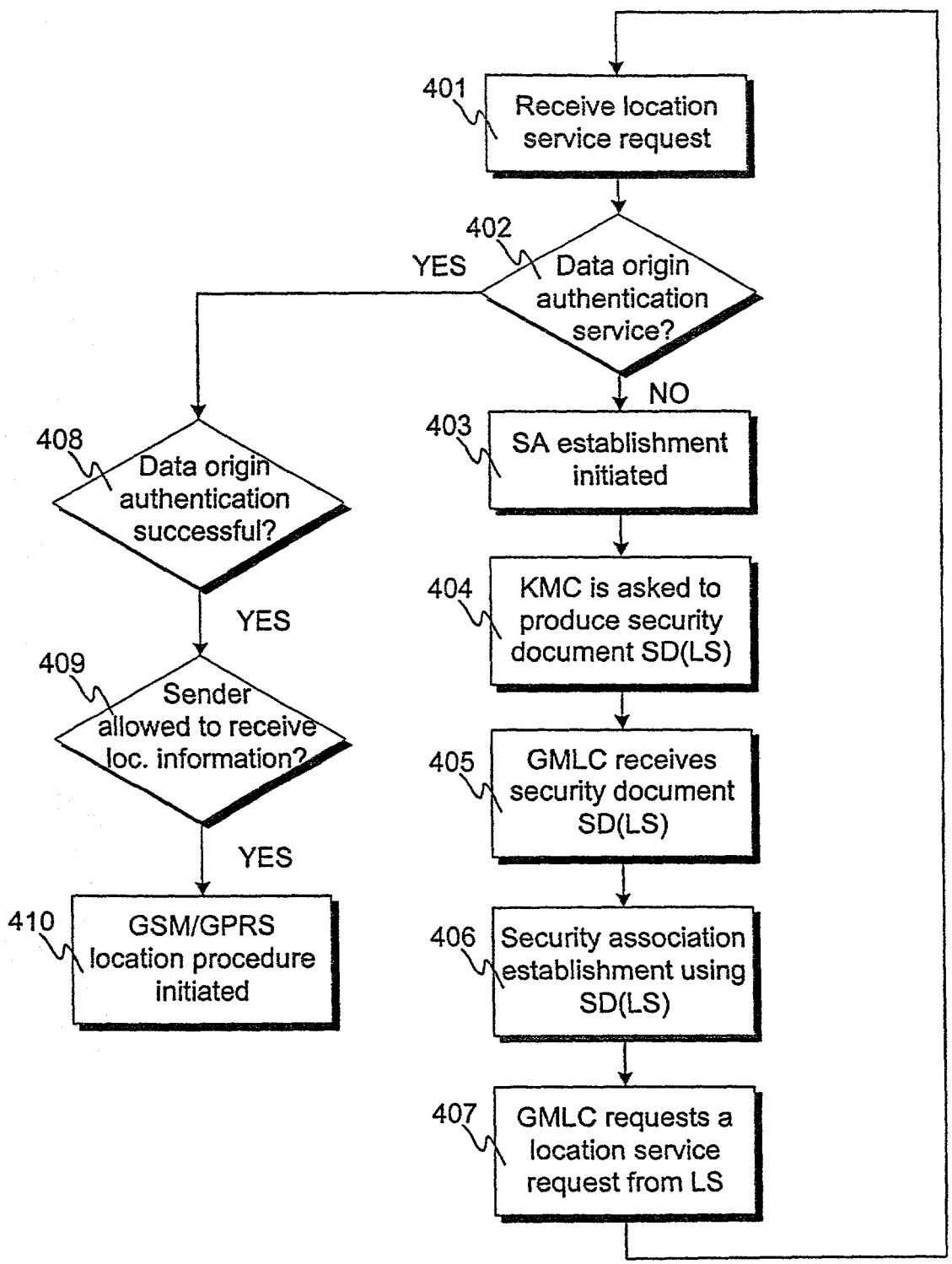
FIG. 4 illustrates a flowchart of a method according to a first preferred embodiment of the invention.

FIG. 4 presents a flowchart describing a method according to the first preferred embodiment of the invention. In step 401 the GMLC receives a location information request message. Using the protocol headers of the data packet(s), for example, it may check if at least data origin authentication is applied on the data packet(s) in step 402. If no data origin authentication information is provided within the data packets, it can be assumed that there is no security association pointing from the sender towards the GMLC. Therefore the GMLC initiates security association establishment in step 403. It is also possible that the Location Server initiates the security association establishment before it requests location information; in that case the procedure starts in step 403. Details of the security association establishment are discussed below. This security association establishment involves step 404, where the KMC is asked to produce a security document relating to the sender, and step 406, where the GMLC receives the security document. Thereafter the security association establishment is carried out using at least some information provided in the security document. To receive a location information request secured with proper data origin authentication, the GMLC may in step 407 ask the sender to transmit the request again (or for the first time, if the procedure started from step 403).

If at least data origin authentication information is present in the data packet(s) relating to the location information request, after successfully authenticating the sender in step 408, the GMLC may check that the sender is authorized to receive location information in step 409. Thereafter the GMLC initiates the GSM/GPRS location procedure in step 410. The GSM/GPRS location procedure may be, for example, such a procedure as presented in FIG. 2. Furthermore, it is possible that the GMLC wishes to transmit encrypted location information. In this case a second security association pointing from the GMLC towards the LS is also established.

The contents of the security document issued by the KMC depend on whether secret key or public key cryptography is used. If public key cryptography is used, the security document relating to an entity X may be a certificate $C(PK_X, ID_X; S_{KMC})$, where $PK_X$ is the public key of X, $ID_X$ is an identifier indicating X (typically its IP address) and $S_{KMC}$ is a cryptographic signature produced by the KMC to prove the authenticity of the certificate. Because there usually is such a cryptographic signature in a public key certificate, it is not necessary to transmit the certificates using methods that provide data integrity and data origin authentication. If secret key cryptography is used, the KMC usually needs to know the identity of both entities X and Y involved in the security association establishment. The KMC may generate a key $K_{X-Y}$ and place this into the security document together with an identifier $ID_X$. Thereafter it typically encrypts the security document using a secret key $K_{KMC-Y}$, which it shares with Y. The security document SD, which is delivered to Y and relates to X, may thus be $SD(ID_X, K_{X-Y}; K_{KMC-Y})$. At least the key $K_{X-Y}$ in the security document SD is encrypted with the last argument $K_{KMC-Y}$. The KMC typically delivers the same secret key $K_{X-Y}$ and identifier $ID_Y$ in a second security document $SD(ID_Y, K_{X-Y}; K_{KMC-X})$. The key $K_{KMC-X}$ is a shared secret between X and the KMC.

Figure 5:
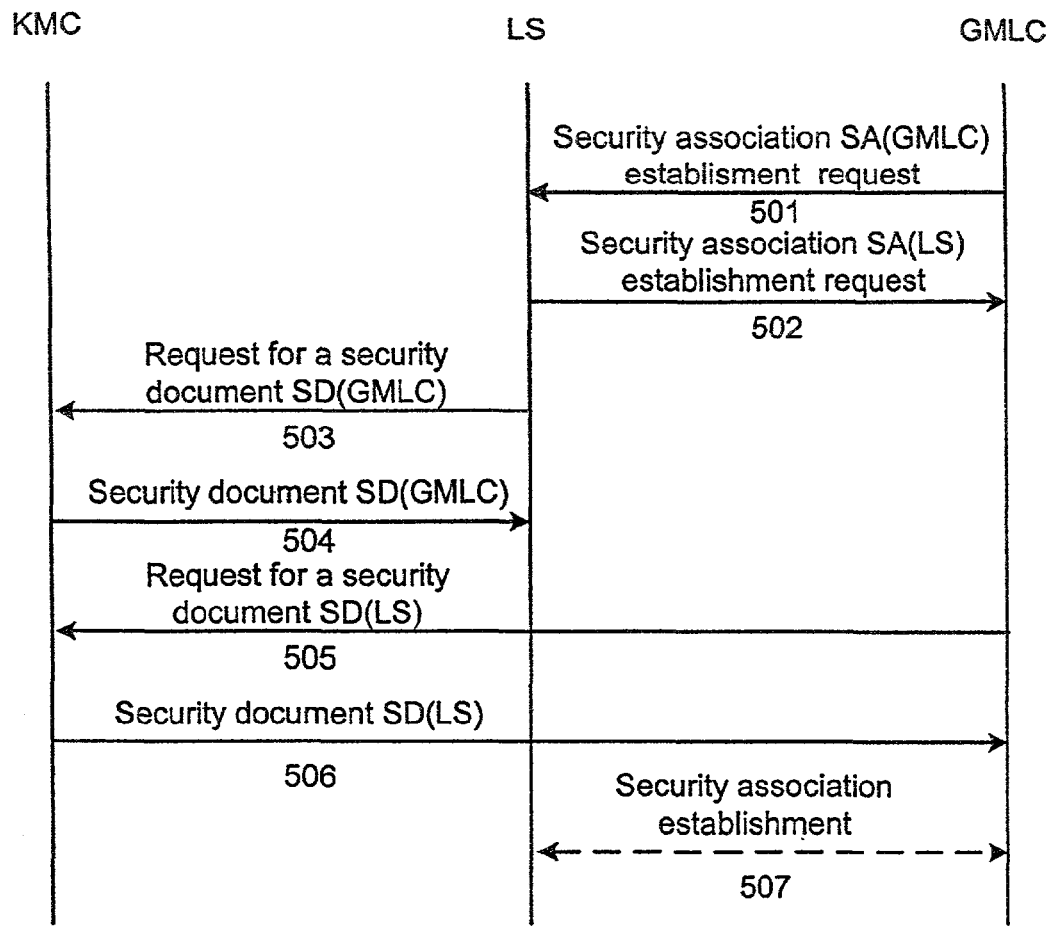
FIG. 5 illustrates a message sequence chart relating to the security documents and security association establishment according to a second preferred embodiment of the invention.

FIG. 5 presents, as an example, a message sequence chart for carrying out the security association establishment according to a second preferred embodiment of the invention, where secret key cryptography is used. In FIG. 5, the GMLC initiates the procedure by sending a security association establishment request 501 to the LS. The security association requested is a security association pointing towards the GMLC, and it is marked here with SA(GMLC). The request 501 may, for example, explicitly state the endpoint of the security association, or the receiver may infer the endpoint to be the sender of the request 501. The LS may, after receiving the request 501, indicate that is wishes to establish a second security association SA(LS) with a request 502. Typically the SA(LS) is requires the encryption of data. It is also possible that the GMLC asks also for the security association SA(LS), in which case the messages 501 and 502 can be single message. The LS asks the KMC for a security document relating to the GMLC with a security document request 503, and the KMC delivers the security document SD(GMLC) (message 504 in FIG. 5). The security document SD(GMLC) may be, for example, $SD(ID_{GMLC}, K_{LS-GMLC}; K_{KMC-LS})$, as discussed above. Similarly, the GMLC asks the KMC for a security document relating to the LS with a security document request 505, and the KMC delivers the security document SD(LS) (message 506 in FIG. 5). After receiving the security documents the GMLC and LS can establish the requested security association(s) (arrow 507 in FIG. 5). Typically there is a separate protocol for establishing a security association, and authentication of each other is typically involved in security association establishment. When secret key cryptography is used, the knowledge of the key $K_{LS-GMLC}$ is usually tested in authentication. If the security associations are Internet Security Associations, the protocol to establish them is typically ISAKMP. Furthermore, it is also possible that an existing protocol such as Oakley key determination protocol or one of the other possible protocols for establishing security associations includes the messages 501-506 or similar messages.

The order of the messages and the names of the messages presented in FIG. 5 are examples. The messages can be delivered in a different order. For example, as soon as the GMLC has received the location information request sent by the LS, the LS and GMLC know the identities of each other. They can ask the KMC to deliver the security documents before the security establishment requests are sent.

Figure 6:
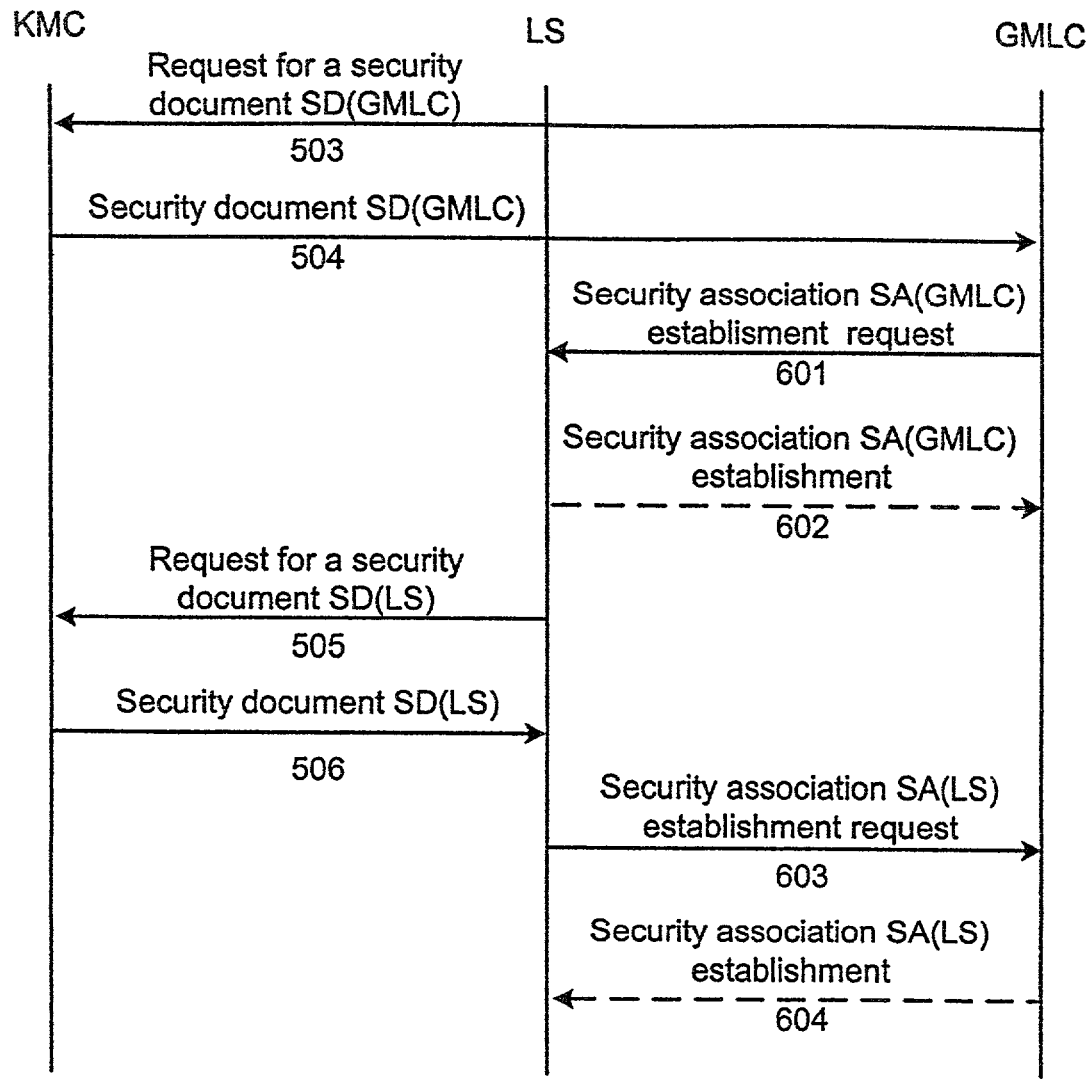
FIG. 6 illustrates a message sequence chart relating to the security documents and security association establishment according to a third preferred embodiment of the invention.

FIG. 6 presents, as an example, a message sequence chart for carrying out the security association establishment according to a third preferred embodiment of the invention, where public key cryptography is used. When public key certificates are used, the GMLC, for example, can ask the KMC to deliver a certificate $C(PK_{GMLC}, ID_{GMLC}; S_{KMC})$ and deliver this certificate to the LS in the security association request message. It is also possible that the LS fetches the certificate $C(PK_{GMLC}, ID_{GMLC}; S_{KMC})$ from the KMC. In FIG. 6, the GMLC asks the KMC to deliver the certificate $C(PK_{GMLC}, ID_{GMLC}; S_{KMC})$, which is marked as SD(GMLC) in FIG. 6 (message 503). The KMC delivers the certificate (message 504), and thereafter the GMLC sends a security association SA(GMLC) establishment request 601 to the LS. This request 601 comprises also the certificate. After the LS receives the request 601, it can authenticate GMLC. The authentication can be carried out using, for example, a challenge-and-response authentication, or the LS can check the validity of a cryptographic signature, which GMLC has placed to the request 601. If the authentication of only GMLC is sufficient for establishing the security association SA(GMCL), it can be established at this point (arrow 602). If a second security association SA(LS) is required, similar messages are exchanged between the LS and the KMC (messages 505 and 506) and between the LS and GMLC (security association SA(LS) request 603). Thereafter the security association SA(LS) can be established (arrow 604).

As discussed above, typically there is a separate protocol for establishing a security association. It is also possible that an existing protocol for establishing security associations includes the messages 601 and 602 or similar messages. The order of the messages and the names of the messages presented in FIG. 6 are examples. The messages can be delivered in a different order. Public key certificates can typically be asked from a KMC (or, more precisely, from a Certification Agent CA) either online, during a certain procedure, or offline, before the procedure. If the LS and GMLC already have a certificate of the other entity, they need not to ask them again from the KMC.

Figure 7:
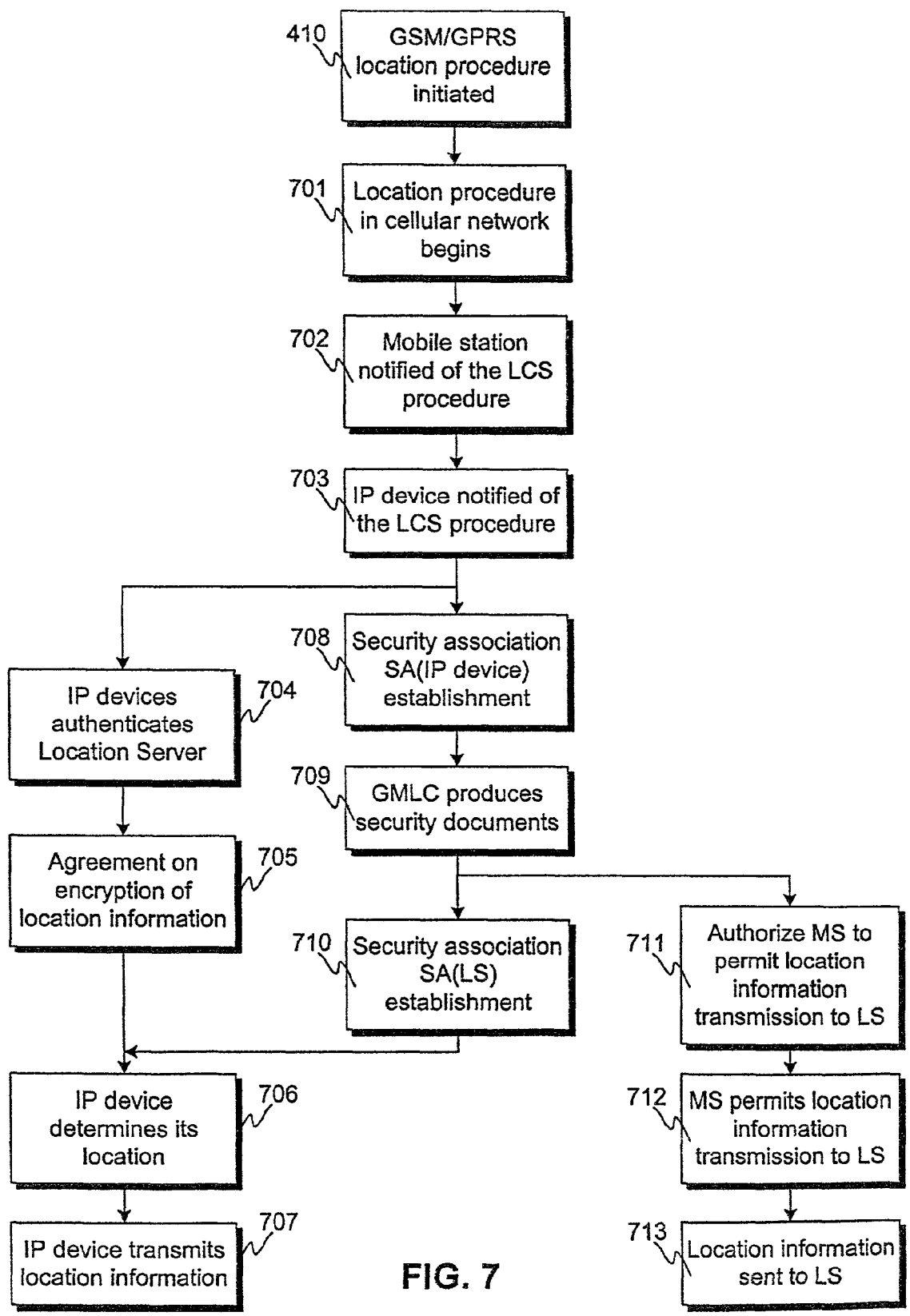
FIG. 7 illustrates a flowchart of a method according to a fourth preferred embodiment of the invention.

In a fourth preferred embodiment of the invention, the IP device, whose location is requested, wishes to authenticate the LS before location information is delivered to the LS. A flowchart of a method according to a fourth preferred embodiment is presented in FIG. 7. The flowchart is a continuation to the flowchart in FIG. 4, and it begins with step 410, where the location procedure of a cellular network is initiated. In step 701, the location procedure is carried out and at some point of the procedure a mobile station typically receives a notification that its location is requested. In FIG. 7, this occurs in step 702. The mobile station may inform an IP device connected to the mobile station about the location request (step 703). The indication sent to the mobile station may comprise an identifier of the LS, and it is possible that the IP device and the Location Server authenticate each other, for example, using a shared secret on which they have beforehand agreed. Authentication using public keys is also possible. This is presented in step 704. After successful authentication, the IP device and the Location Server can agree on the encryption method used to protect to location information (step 705). The IP device may have some means of determining its location, for example a Global Positioning System receiver, and it may locate itself (step 706). Thereafter it may send the location information to the Location Server in step 707.

FIG. 7 present also alternatives, where the IP device wishes to establish a security association pointing to itself from the Location Server (step 708). It is possible that the GMLC is involved as a third party in this security association establishment (step 709); this is discussed in more detail below. It is also possible that a second security association, which points from the IP device to the Location Server and specifies, for example, encryption of data, is established (step 710). The first security association allows the IP device to authenticate the Location Server. The second security association is typically used, when the IP device determines its own location (step 706), and it allows the IP device to transmit location information confidentially to the Location Server (step 707). It is also possible that the IP device authorizes the mobile station to grant a permission to transmit location information to the Location Server (step 711). In this case, it typically is sufficient to have only one security association pointing towards the IP device. After the authorization, the mobile station sends to the cellular network a message to permit the transmission of location information (step 712). If the location of the mobile station is not yet determined, the location procedure is completed at this time. The mobile station may be involved here, and even determine its own location and transmit the information via the cellular network to the GMLC. The location information is transmitted to the Location Server typically from the GMLC in step 713. The sequence of steps in FIG. 7 is just an example of a method according to the invention, similarly as the alternatives presented in FIG. 7. One further alternative, for example, is that the mobile station determines its location, and thereafter the IP device transmits the information to the Location Server.

In a method according to the invention, the Location Server and the IP device may thus additionally or optionally establish security associations between themselves, if they have a common key management center in the Internet. Once the IP device has authenticated the LS, it can notify the mobile station to communicate to the GMLC (or to another network entity in the cellular network) a permission to transmit the location information. One alternative for the IP device to authenticate the LS is to be involved in establishing a security association pointing from the IP device itself towards the LS. Properly selected security associations allow the LS and IP device to authenticate each other.

Figure 8:
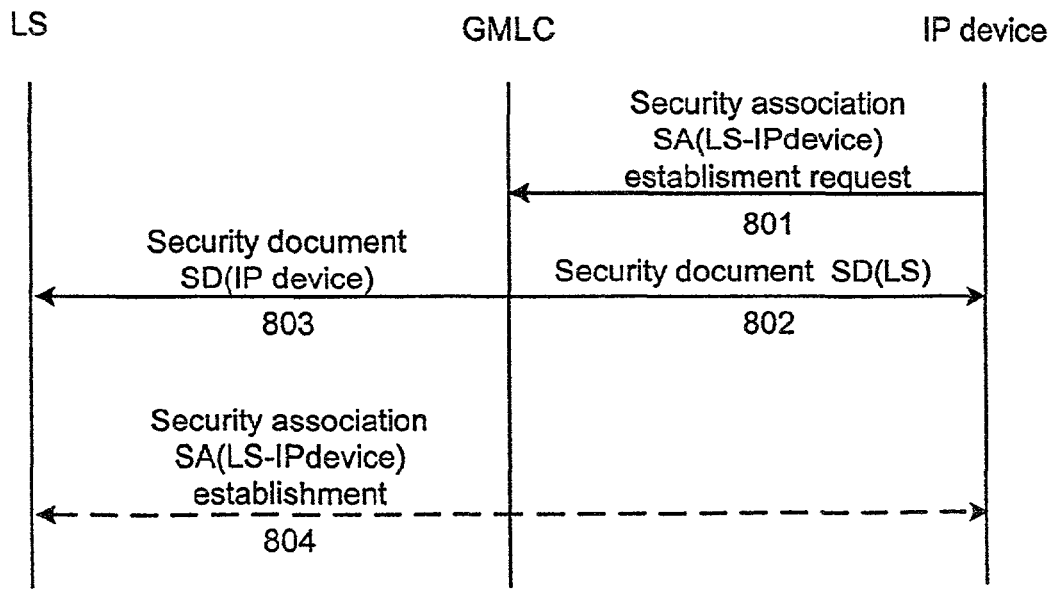
FIG. 8 illustrates a message sequence chart relating to the security documents and security association establishment according to the invention.

As discussed above, it is possible that the IP device or the LS wishes to establish security associations between the IP device and the LS, and in the Internet there may not be a common key management center which both the IP device and LS trust for their data origin authentication and payload encryption. The GMLC trusts the mobile station, as the mobile station is authenticated by the cellular network. The mobile station trusts the cellular network and the GMLC by default or through building security associations between the GMLC and the mobile station. The HRL of the mobile station may act as a key management center for the MS and GMLC, if needed. The mobile station, furthermore, can perform mutual authentication with the IP device. This is a feasible way to establish security associations between the Location Server and the IP device, after the GMLC has authenticated the Location Server, using the GMLC as a key management center. The authentication of the Location Server can, for example, be a part of establishing a security association between the Location Server and the GMLC presented in FIGS. 5 and 6. FIG. 8 presents a message sequence chart relating to establishment of the bi-directional security associations between the IP device and the LS (cf steps 708-710 in FIG. 7). The IP device asks from the GMLC an establishment of a security association towards the LS (message 801). Alternatively, this message can be sent by the Location Server. If the GMLC has not already authenticated the Location Server, the GMLC typically needs to establish security associations with the Location Server first. It may perform the procedure presented in FIG. 5 or 6 at this point. If there already are, for example, bi-directional security associations between the Location Server and the GMLC enabling at least data origin authentication, then the GMLC may proceed to sending to the IP device a security document relating to the Location Server (message 802). The security document typically is a security document $SD(ID_{LS}, K_{LS\text{-}IPdevice}; K_{GMLC\text{-}IPdevice})$, and a similar security document $SD(ID_{IPdevice}, K_{LS\text{-}IPdevice}; K_{GMLC\text{-}LS})$, is sent to the Location Server (message 803). The security documents may alternatively be public key certificates issued by the GMLC, if the GMLC knows the public key of the Location Server and IP device. With the help of the information included in the security documents, the Location Server and IP device can establish a bi-directional security association between themselves (arrow 804). If the security associations are Internet Security Associations, it is possible that a multiple of unidirectional Internet Security Associations is established.

Especially if the IP device itself has positioning capability, for example there is a built-in GPS receiver in the IP device, it may wish to exchange information about its geographical location directly with a Location Server. In this case it is possible that after the mobile station receives a LCS notification, the IP device and the Location Server establish security associations between themselves and exchanges location information, as discussed above. This exchange of location information may occur, for example, in addition to the location information transmission from the GMLC to the Location Server. It is also possible that the mobile station denies the cellular network to transmit information to the Location Server, but the IP device, after authenticating the Location Server, transmits location information to the Location Server.

Figure 9:
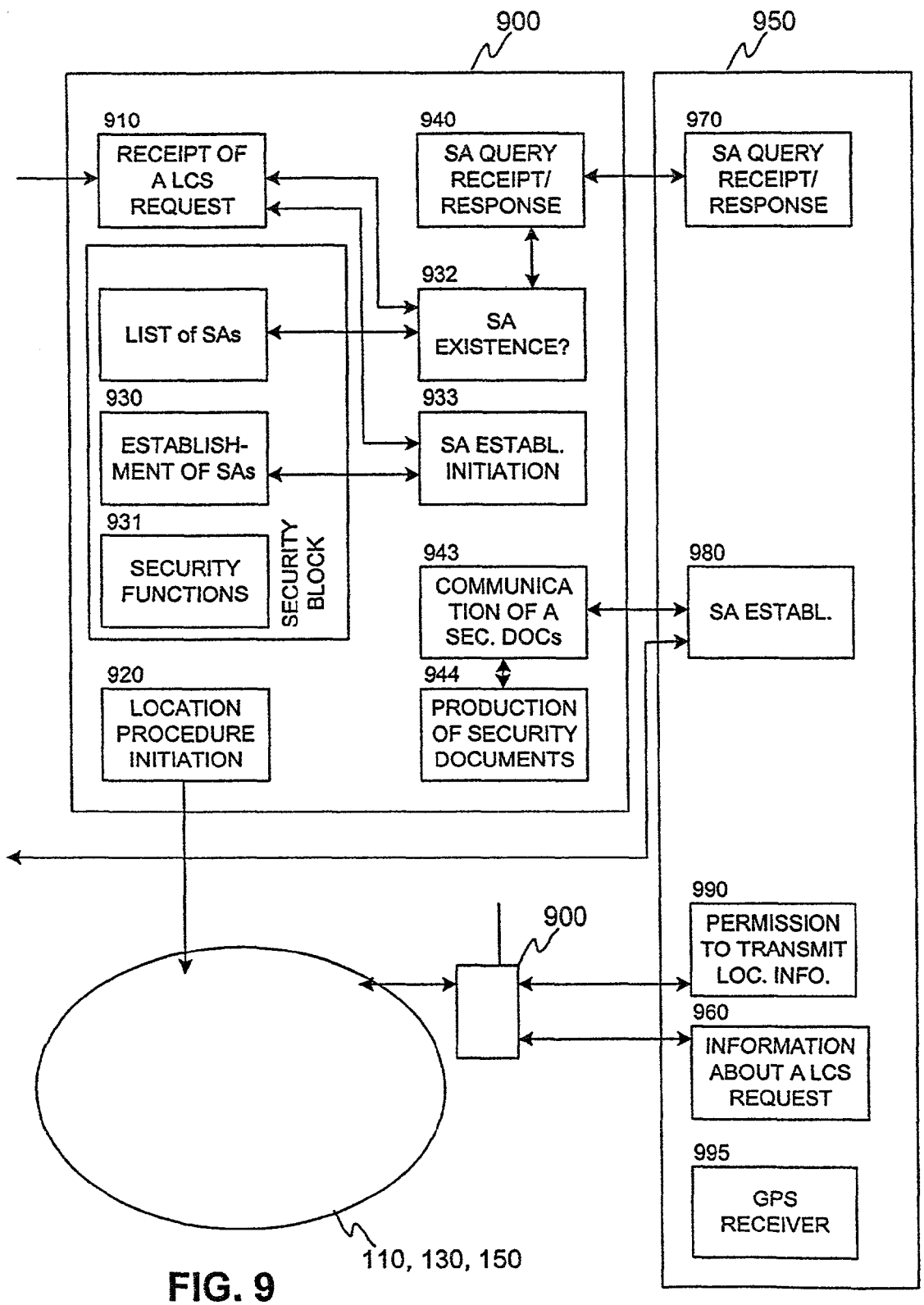
FIG. 9 illustrates a network element, a packet data device and a mobile station according to the invention.

FIG. 9 illustrates schematically a network element 900 of a cellular network according to one embodiment of the invention, a packet data device 950, which is attachable to a mobile station or an integral part of a mobile station, according to the invention and a mobile station 901 according to the invention. The network element 900, packet data device 950 and mobile station 901 may support any method according to the invention, preferably one of those described as preferred embodiments of the invention.

A network element 900 of a cellular network has the following means: means (910) for receiving from a packet data network a location information request relating to a certain mobile station, and means (920) for initiating a location procedure in the cellular network. Furthermore, it has means (930) for establishing security associations pointing to the network element from a network element of the packet data network, this security association establishment typically involving a Key management Center in a public packet data network. Further it has means (931) for performing security functions as specified by the security associations on data it receives from the packet data network, means (932) which are arranged to determine, if there is an existing security association pointing to the network element from a sender of a location information request, and means (933) for initiating security association establishment, which are arranged to establish a security association if there does not exist a security association, which points towards the network element from the sender of a location information request. Typically the means are realized using microprocessors and software. The means comprised in the security block are typically realized using Internet protocol, IPSec protocol and, for example, ISAKMP and Oakley.

The network element 900 may additionally have means (940) for receiving, for example, from an IP device reachable via the cellular network a request about a security association, which points to the network element from a certain network element of the packet data network. The network element may have means (932) for determining whether a requested security association exists, and means for transmitting (940) information about the requested security association to the device. The network element 900 may also additionally have means (943) for receiving a request to produce security documents relating to the device and to the sender of a location information request, and means (944) for producing a first security document relating to the device and a second security document relating to the sender of the location information request.

The network element 900 may be a network element of a GSM/GPRS network, preferably a Gateway Mobile Location Center, or a network element of a UMTS network.

A packet data device 950 is either an integral part of a mobile station or it is a separate device which can be attached to a mobile station. In the latter case it may be, for example, a laptop computer or a personal organizer. The packet data device 950 has means (960) for receiving information about a location information request and about a sender of a location information request from the mobile station and means (970) for exchanging with a network element connected to a cellular network information about a security association, which points to the network element from the sender of the location information request.

The packet data device 950 may additionally have means (980) for establishing a second security association (presented as arrow 302 in FIG. 3), which points to the device from the sender of the location information request and specifies at least data origin authentication. It may further have means for requesting a network element of the cellular network to produce security documents relating to the device and to the sender of the information request for the establishment of the second security association, as discussed in connection with FIG. 7.

Furthermore, the packet data device 950 may have means (990) for transmitting to the mobile station a permission to send location information to the sender of the location information request, when there exists a security association pointing from the sender of the location information request to the GMLC, for example. Once the device has ascertained itself that the GMLC has authenticated the Location Server, it may decide to permit the transmission of location information. It is also possible that the packet data device 950 has means for locating itself, for example an in-built GPS receiver 995.

The mobile station 901 has means for receiving from a cellular network a notification about a location information request and means for responding to the cellular network with a notification response. It furthermore has means for notifying a device, which is attached to the mobile station, about the location information request.

The means for responding to the cellular network may expect the device to give a permission, and only thereafter send a positive response is sent to the cellular network. In other words, the means for responding to the cellular network are initiated by a permission sent by the device.

The invention claimed is:

1. A method comprising:
   receiving a location information request at a first network element, which is connected to a cellular network, from a second network element, which is connected to a packet data network, the location information request relating to a mobile station associated with the cellular network;
   determining to transmit a request to a third network element, which is connected to the packet data network, the request requesting a security document relating to the second network element;
   determining to initiate establishment of at least one security association that at least specifies data origin authentication and points from the second network element to the first network element, wherein the establishment at least involves use of information comprised in the security document;
   determining to authenticate, after successful establishment of the at least one security association, a data origin of the location information request; and
   determining to initiate, if the data origin of the location information request is authenticated successfully, a location procedure relating to the mobile station.

2. A method according to claim 1, wherein the security document relating to the second network element is a public key certificate, which comprises an identifier specifying the second network element and a public key of the second network element and which is cryptographically signed by the third network element.

3. A method according to claim 1, further comprising:
   determining to request, from the third network element, a second security document relating to the first network element.

4. A method according to claim 3, wherein the security document comprises a first key, which is encrypted using a second key shared between the first network element and the third network element, and the second security document comprises the first key, which is encrypted using a third key shared between the second network element and the third network element.

5. A method according to claim 3, further comprising:
   determining to initiate establishment of a second security association that points from the first network element to the second network element using at least information comprised in the second security document.

6. A method according to claim 5, wherein the security association is a set of Internet Security Associations pointing from the second network element to the first network element and the second security association is a second set of Internet Security Associations pointing from the first network element to the second network element.

7. A method according to claim 5, wherein the second security association at least specifies data encryption.

8. A method according to claim 1, wherein the security association is a set of Internet Security Associations pointing from the second network element to the first network element.

9. A method according to claim 1, further comprising:
   determining to generate the security document by the third network element, which is connected to the packet data network;

determining to initiate establishment of at least one other security association using at least information comprised in the security document, the at least one other security association at least specifying data origin authentication and pointing from the second network element to the first network element;

determining to authenticate, after successful establishment of the at least one other security association, a data origin of the location information request; and determining to implement a location procedure, the location procedure relating to the mobile station.

10. A method according to claim 9, further comprising:
determining to transmit location information relating to the mobile station to the second network element.

11. A method according to claim 10, wherein the location information relating to the mobile station is determined to be transmitted to the second network element from the first network element.

12. A method according to claim 11, further comprising:
determining to generate a second security document by the third network element, the second security document relating to the first network element; and
determining to initiate establishment of a second security association using at least the information specified in the second security document, the second security association at least specifying data encryption and pointing from the first network element to the second network element.

13. A method according to claim 10, further comprising:
determining to initiate, before determining to transmit the location information to the second network element, establishment of a third security association, which at least specifies data origin authentication and points from the second network element to a packet data device, wherein the packet data device is either connected to the mobile station or is an integral part of the mobile station.

14. A method according to claim 10, wherein the location information relating to the mobile station is determined to be transmitted from a device, which is either connected to the mobile station or is an integral part of the mobile station.

15. A method according to claim 14, further comprising:
determining to initiate, before determining to transmit the location information to the second network element, establishment of a third security association, which at least specifies data origin authentication and points from the second network element to a packet data device, wherein the packet data device is either connected to the mobile station or an integral part of the mobile station.

16. A method according to claim 15, further comprising:
determining to initiate, before determining to transmit the location information, establishment of a fourth security association, which at least specifies data encryption and which points to the second network element from the packet data device.

17. A method according to claim 14, further comprising:
determining to receive via the mobile station a notification relating to the location procedure associated with the mobile station, wherein the mobile station is configured to inform the packet data device about the notification.

18. A method according to claim 1, wherein the first network element is a network element of a general packet radio service network.

19. A method according to claim 18, wherein the first network element is a gateway mobile location center.

20. A method according to claim 1, wherein the first network element is a network element of a universal mobile telecommunications service network.

21. An apparatus comprising:
at least one processor; and
at least one memory including computer program code, the at least one memory and the computer program code being configured, with the at least one processor, to cause the apparatus at least to:
receive, from a packet data network, a location information request relating to a mobile station,
determine to initiate a location procedure in a cellular network,
determine to initiate establishment of security associations pointing to the apparatus from a network element of a packet data network,
determine to perform security functions specified by the security associations on data received from the packet data network,
determine if there is an existing security association pointing to the apparatus from a sender of the location information request, and
determine to initiate security association establishments, which are configured to establish security associations if security associations do not exist, wherein the security association establishments point to the apparatus from the sender of the location information request.

22. An apparatus according to claim 21, wherein the apparatus is at least further caused to:
receive, from a device reachable via the cellular network, a request about a particular security association, which points to the apparatus from a certain network element of the packet data network;
determine whether the particular security association exists; and
determine to transmit information about the particular security association to the device.

23. An apparatus according to claim 21, wherein the apparatus is at least further caused to:
receive a request to generate security documents relating to the device and to the sender of a the location information request; and
determining to generate a first security document associated with the device and a second security document associated with the location information request.

24. An apparatus according to claim 21, wherein the apparatus is a network element of a general packet radio service network.

25. An apparatus according to claim 24, wherein the apparatus is a gateway mobile location center.

26. An apparatus according to claim 21, wherein the apparatus is a network element of a universal mobile telecommunications service network.

27. An apparatus comprising:
at least one processor; and
at least one memory including computer program code, the at least one memory and the computer program code being configured, with the at least one processor, to cause the apparatus at least to:
receive, from a location service client of a mobile station, information comprising a location information request relating to a packet data device and information about the location service client; and
determine to exchange information about a security association with a network element connected to at least one of a packet data network and a cellular network, the security association pointing to the network element from the mobile station.

28. An apparatus according to claim 27, wherein the apparatus is at least further caused to:
   determine to establish a second security association, which points to the apparatus from the mobile station and at least specifies data origin authentication.

29. An apparatus according to claim 28, wherein the apparatus is at least further caused to:
   determine to request a network element of the cellular network to generate security documents relating to the apparatus and to the mobile station,
   wherein the security documents are utilized to establish the second security association.

30. An apparatus according to claim 27, wherein the apparatus is at least further caused to:
   determine to transmit, to the mobile station, a permission to transmit location information to the mobile station,
   wherein the permission is transmitted to the mobile station if the security association is established.

31. An apparatus according to claim 27, further comprising a receiver of a positioning system.

32. An apparatus according to claim 31, wherein the receiver is a global positioning system receiver.

33. An apparatus comprising:
   at least one processor; and
   at least one memory including computer program code, the at least one memory and the computer program code being configured, with the at least one processor, to cause the apparatus at least to:
      receive a location information request at a first network element, which is connected to a cellular network, from a second network element, which is connected to a packet data network, the location information request relating to a mobile station associated with the cellular network;
      determine to transmit a request to a third network element, which is connected to the packet data network, the request requesting a security document relating to the second network element;
      determine to initiate establishment of at least one security association that at least specifies data origin authentication and points from the second network element to the first network element, wherein the establishment at least involves use of information comprised in the security document;
      determine to authenticate, after successful establishment of the at least one security association, a data origin of the location information request; and
      determine to initiate, if the data origin of the location information request is authenticated successfully, a location procedure relating to the mobile station.

34. An apparatus according to claim 33, wherein the apparatus is further caused to:
   determine to generate the security document by the third network element, which is connected to the packet data network;
   determine to initiate establishment of at least one other security association using at least information comprised in the security document, the at least one other security association at least specifying data origin authentication and pointing from the second network element to the first network element;
   determine to authenticate, after successful establishment of the at least one other security association, a data origin of the location information request; and
   determine to implement a location procedure, the location procedure relating to the mobile station.

\* \* \* \* \*